United States Patent [19]

Fujiwara et al.

[11] Patent Number: 5,623,008

[45] Date of Patent: Apr. 22, 1997

[54] RUBBER COMPOSITION FOR GLASS-RUN

[75] Inventors: Hideyuki Fujiwara; Takashi Mizushima, both of Aichi, Japan

[73] Assignee: Toyoda Gosei Co., Ltd., Japan

[21] Appl. No.: 558,092

[22] Filed: Nov. 13, 1995

[30] Foreign Application Priority Data

Dec. 28, 1994 [JP] Japan .................................. 6-327149

[51] Int. Cl.$^6$ ...................................................... C08K 5/15
[52] U.S. Cl. .............................. 524/114; 25/119; 25/120; 25/121; 25/122; 25/123; 25/124; 25/125
[58] Field of Search .............................. 524/114; 25/119, 25/120, 121, 122, 123, 124, 125

[56] References Cited

FOREIGN PATENT DOCUMENTS 2264523  9/1993  United Kingdom .

Primary Examiner—Edward J. Cain
Attorney, Agent, or Firm—Cushman Darby & Cushman IP Group of Pillsbury Madison & Sutro

[57] ABSTRACT

Disclosed is (1) a rubber composition used for molding a glass-run equipped with a urethane lubricating layer on the sliding area of the glass, which comprises an EPDM and an adhesive modifier, wherein the adhesive modifier comprises glycidyl ether, and a metal hydroxide of a metal selected from metals of the III B group and the II A group and (2) a rubber composition used for molding a glass-run equipped with a urethane lubricating layer on the sliding area of the glass, which comprises an EPDM and an adhesive modifier, wherein the adhesive modifier comprises a glycidyl ether, a metal hydroxide of a metal selected from metals of the III B group and the II A group and an amine-containing compound as an epoxy group ring-opening accelerator, and further a glass-run comprising the above rubber composition.

7 Claims, 1 Drawing Sheet

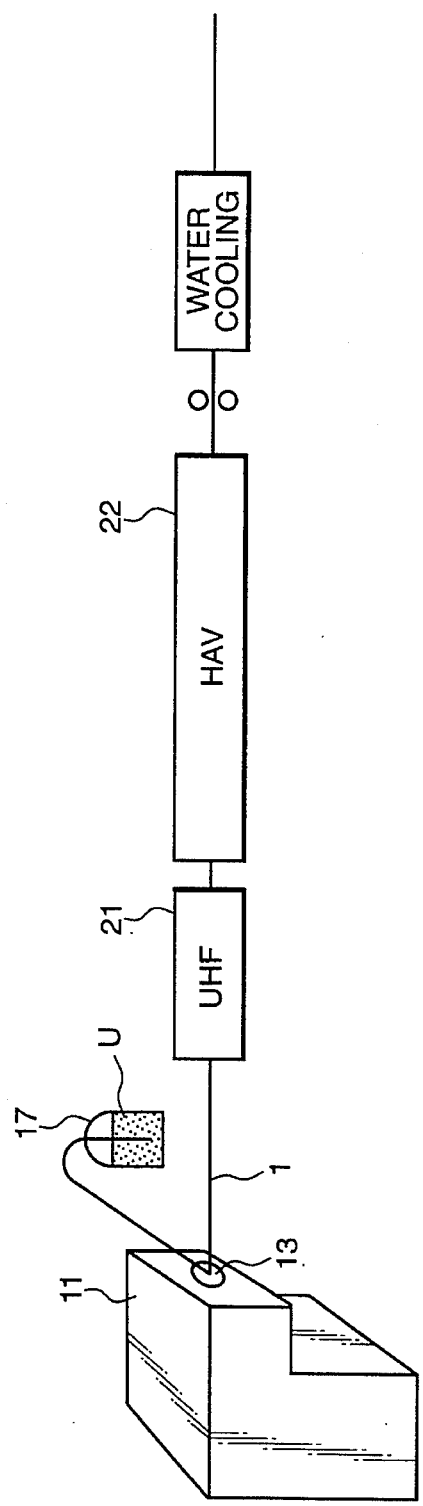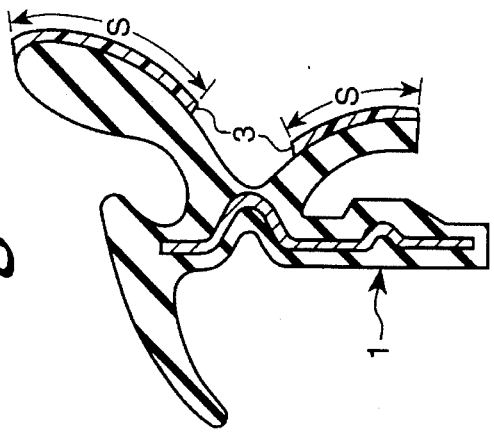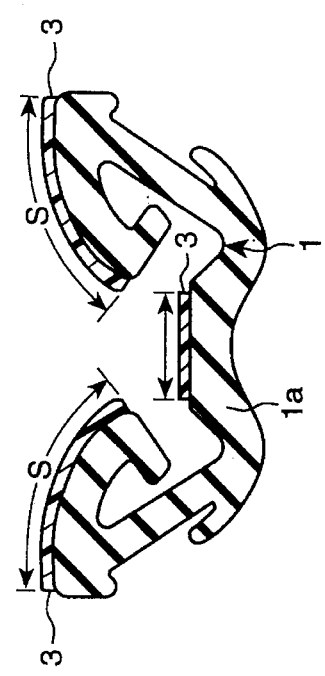

RUBBER COMPOSITION FOR GLASS-RUN

FIELD OF THE INVENTION

This invention relates to an EPDM composition which is obtained by blending an EPDM with an adhesive modifier which is used for molding a glass-run equipped with a urethane lubricating layer on the sliding area of the glass, and especially relates to the EPDM composition for a glass run-rubber composition which is suitable for forming the lubricating layer by coating a urethane paint on the sliding area of the glass without need of forming an adhesive layer while extrusion-molding a glass-run body.

The invention may be applied to a glass-run such as a door glass-run (FIG. 2), a door glass weather strip (FIG. 3) and the like.

The term "EPDM" means the ethylene-propylene rubber which is obtained by copolymerizing ethylene and propylene with a small amount of a non-conjugated diene such as ethylidene norbornene, cyclopentadiene, 1,4-hexadiene and the like and thereby introducing a double bond capable of vulcanizing with sulfur on side chain thereof.

BACKGROUND OF THE INVENTION

A method for producing a glass-run with excellent productivity without need of forming an adhesive layer between a glass-run body and a urethane lubricating layer is disclosed in JP-A-5-237448 (the term "JP-A" as used wherein means an "unexamined published Japanese patent application") as described in detail below.

The conventional method for producing a weather strip comprises steps of:

(a) extrusion-molding a rubber composition containing polyglycidyl methacrylate having an epoxy group;

(b) coating a surface of the extrusion-molded article with a urethane paint by supplying a urethane paint to a forefront of the extruder, while extrusion-molding the rubber composition, and (c) then vulcanizing the coated article.

However, the raw material rubber of the rubber composition is a mixture of SBR/EPDM (referring Example of present invention). Therefore, excellent vulcanized rubber properties (specifically, ozone resistance) inherently possessed by EPDM are deteriorated by blending with SBR. Chemicals used in vulcanization are apt to be transferred from EPDM to SBR due to high polar character thereof. As a result, it has been difficult to obtain a vulcanized rubber having the properties needed for glass-run.

SUMMARY OF THE INVENTION

An object of the present invention is to provide a rubber composition for glass-run which is able to obtain a good adhesion between an EPDM and a urethane lubricating layer without blending the other rubber polymers with the EPDM.

The above-described problems are solved by the constitution of the present invention described below:

(1) A rubber composition used for molding a glass-run equipped with a urethane lubricating layer on the sliding area of the glass, which comprises an EPDM and an adhesive modifier, wherein the adhesive modifier comprises a glycidyl ether, and a metal hydroxide of a metal selected from metals of the III B group and the II A group, and (2) A rubber composition used for molding a glass-run equipped with a urethane lubricating layer on the sliding area of the glass, which comprises an EPDM and an adhesive modifier, wherein the adhesive modifier comprises a glycidyl ether, a metal hydroxide of a metal selected from metals of the III B group and the II A group and an amine-containing compound as an epoxy group ring-opening accelerator.

(3) A glass-run equipped with a urethane lubricating layer on the sliding area of the glass, which comprises an EPDM and an adhesive modifier, wherein the adhesive modifier comprises a glycidyl ether, and a metal hydroxide of a metal selected from metals of the III B group and the II A group.

(4) A glass-run equipped with a urethane lubricating layer on the sliding area of the glass, which comprises an EPDM and an adhesive modifier, wherein the adhesive modifier comprises a glycidyl ether, a metal hydroxide of a metal selected from metals of the III B group and the II A group and an amine-containing compound as an epoxy group ring-opening accelerator.

BRIEF DESCRIPTION OF THE DRAWINGS

FIG. 1 illustrates a schematic view of a preparation method of a glass-run which is manufactured by using a rubber composition of the present invention.

FIG. 2 illustrates a cross-sectional view of a glass-run which is manufactured by using a rubber composition of the present invention.

FIG. 3 illustrates another cross-sectional view of a glass-run which is manufactured by using a rubber composition of the present invention.

DETAILED DESCRIPTION OF THE INVENTION

The present invention is described in detail below.

In the following explanation, parts are by weight.

A rubber composition of the present invention for a glass-run is prepared by blending an EPDM with an adhesive modifier and is used for molding a glass-run equipped with a urethane lubricating layer 3 on the sliding part S of the glass-run. For example, the rubber composition is used for molding the glass-runs and extrusion-molding a glass-run body 1 as shown in FIG. 2 and FIG. 3.

For preparing the rubber composition, the EPDM is mixed with the adhesive modifier described in detail below and a normal additive such as a reinforcing filler (e.g., carbon black or white carbon), a plasticizer, a lubricant, chemicals for vulcanization and the like and then, the mixture is kneaded by a kneader, etc.

The vulcanization is normally carried out by a method using sulfur in view of operating characteristics (safety properties) and equipment, but a method using a peroxide may be also carried out.

The adhesive modifier of the present invention is a two component system comprising a glycidyl ether and a metal hydroxide of a metal selected from metals of the III B group and the II A group of the periodic table; or a three component system which further adds an amine-containing compound as an epoxy group ring-opening accelerator to the two component system.

When the three component system containing the amine-containing compound is used, amounts of added glycidyl ether and metal hydroxide can be decreased as shown in the Examples below (if the amount of metal hydroxide added is too much, properties of vulcanized rubber are easily degraded) and as a result, a formulation becomes easy. A preferable component ratio of the adhesive modifier in the three component system and the two component system is shown below.

The parts by weight of the adhesive modifier is the amounts per 100 parts by weight of the EPDM as given in Table 1.

(1) The adhesive modifier in the three component system:

A preferred adhesive modifier in the three component system includes:

(a) 5 to 20 parts by weight (more preferably 5 to 10 parts by weight) of a glycidyl ether, (b) 20 to 100 parts by weight (more preferably 20 to 50 parts by weight) of a metal hydroxide of a metal selected from metals of the III B group and the II A group of the periodic table, and (c) 0.5 to 5 parts (more preferably 1 to 3 parts by weight) of an amine-containing compound as an epoxy group ring-opening accelerator.

(2) The adhesive modifier in the two components system:

A preferred adhesive modifier of the two component system includes:

(a) 5 to 20 parts by weight (more preferably 5 to 10 parts by weight) of a glycidyl ether, and (b) 20 to 100 parts by weight (more preferably 40 to 60 parts by weight) of a metal hydroxide of a metal selected from metals of the III B group and the II A group of the periodic table wherein the sum of the amounts of the glycidyl ether and the metal hydroxide of a metal selected from the metals of the III B group and the II A group of the periodic table is at least 30 parts by weight (more preferably at least 40 parts by weight).

Each component of the adhesive modifier in the three component system and the two component system cooperats to provide excellent effects and/or actions and thereby improves the adhesive properties between an EPDM base material (i.e., a glass-run body) and a urethane coated lubricating layer as described below.

1. One of the above-mentioned advantages is a cross-linked adhesive effect between the EPDM base material and the urethane lubricating layer which is obtained by a reaction of a glycidyl group (i.e., an epoxy group) of the glycidyl ether (monomer) with a urethane paint for forming a coated film of lubricating layer. If the amount of the glycidyl ether is too little, the intended cross-linked adhesive effect is not obtained. If the amount of the glycidyl ether is too much, the desirable properties of vulcanized rubber are easily lost.

Examples of glycidyl ether include an alkylene oxide adduct of bisphenol A and a polyalkylene oxide. Of these, a propylene oxide adduct of bisphenol A is most preferred.

Polyglycidylmetacrylate as the conventional adhesive modifier which is disclosed in JP-A-5-237448 is a polymer and it differs from the monomer of the present invention.

2. Another advantage of the present invention is improved wettability between the EPDM base material (i.e., a glass-run body) and the urethane paint due to addition of the metal hydroxide. If the amount of the metal hydroxide is too little, the improvement in wettability is not effected to the desired extent. If the amount of the metal hydroxide is too much, the vulcanized rubber properties are easily degraded.

Specific examples of the metal hydroxide include aluminum hydroxide, magnesium hydroxide, calcium hydroxide and the like, and of these, aluminum hydroxide, which is usually a hydrate and has a particle diameter of 1 to 25 microns is more preferably used in view of cost merit and material-extrudability.

3. Still another advantage of the present invention is the enhancement of the cross-linked adhesion using the amine-containing compound by promoting the reaction of the epoxy group with the urethane resin. If the amount of the amine-containing compound is too little, the action is not effected to the desired extent. If the amount of the amine-containing compound is too much, the vulcanized rubber properties are easily degraded.

Of the amine-containing compounds, a primary amine which greatly influences a rubber-vulcanizing reaction is not preferred. Also, an aliphatic amine is not preferred from the viewpoint of storage stability since the aliphatic amine is reactive at room temperature. Accordingly, as an amine-containing compound, a quinoline derivative or a phenyl amine derivative such as poly (2,2,4-trimethyl-1,2-dihydro quinoline;4,4'-($\alpha,\alpha$-dimethyl benzyl)diphenylamine and N-phenyl-N'(3-methacryloyloxy-2-hydoxypropyl)-p-phenylenediamine is preferably used.

4. A method for manufacturing the glass run using the rubber composition comprising EPDM according to the present invention is explained below in more detail by reference to the following examples, but the invention should not be construed as being limited thereto.

(a) While extruding the rubber composition comprising EPDM for forming a glass-run body 1, a urethan coated lubricating layer 3 is formed by coating a urethane paint U on the sliding part S of the glass-run and by curing simultaneously the coated urethan paint U and the extruded rubber composition in the vulcanizing step of the glass-run body 1.

(b) The paint used in forming the urethane lubricating layer may be either a normal solvent-type urethane paint or more preferably a solventless-type urethane paint.

The solventless-type urethane paint is a liquid containing a coated film-forming liquid-component which is obtained by adding a polyisocyanate compound to a liquid polyol compound, a secondary coated film-forming component such as a lubricant and the like, and a pigment, but containing no volatile diluting agent such as solvents. The solventless-type urethane paint is used for preventing a problem when the coated urethane paint is cured in the vulcanizing step of the glass-run. If solvent penetrates into the rubber before vulcanization, it vaporizes so that foam is formed in the surface of the rubber base material and thereby craters are formed on the coated film.

A two liquid-type paint such as Desmophen/Sumidoule paint as shown in Table 2 is normally preferably used and a one liquid-type paint may also be used.

It is preferable to add a liquid or solid lubricant to the urethane paint. Examples of the lubricant include liquid lubricants such as dimethyl silicone oil (kinetic viscosity: 3,000–300,000 cSt) and solid lubricants such as powdered Teflon resin (particle diameter: 5–30 micron), powdered nylon resin (particle diameter: 5–50 micron), molybdenum disulfide, boron nitride, tungsten disulfide, graphite fluoride and the like. The amount of the added lubricant preferably is 5–100 parts based on 100 parts of the urethane paint (i.e., coated film component). If the amount of the lubricant is less than 5 parts, the effect is not obtained to the desired extent. If the amount of the lubricant is more than 100 parts, the adhesion with the base material is easily reduced.

(c) Coating the urethane paint U on the sliding part S is carried out while extrusion-molding the glass-run body 1. For example, a nozzle for coating the urethane paint is attached inside of the extruding die 13 of the extruder 11 for the glass-run body 1 or is attached just in front of the extruding die 13. The nozzle is connected to a tank 17 of the coating device.

The coating is normally carried out by a flow coating and when the nozzle is attached just in front of the extruding die 13, conventional methods such as brush coating, roller coating, immersion coating, spray coating and the like may be applied.

The thickness of the coated film is 20–2,000 microns depending on sliding properties required.

(d) conventional methods are used for curing together the coated urethane paint and the glass-run body 1 in the vulcanizing step.

For example, the vulcanizing step shown in FIG. 1 is carried out using a microwave heating apparatus (UHF) 21 and a hot air vulcanizing apparatus (HAV) 22.

The vulcanization is normally carried out for 3–10 minutes at 200° C. These conditions are sufficient for curing the urethane paint.

According to the present invention, while extrusion-molding the glass-run body 1, the urethane paint for forming the urethane lubricating layer 3 is coated and then the coated urethane paint and the glass-run body 1 are simultaneously cured in the vulcanizing step, thus forming the urethane lubricating layer 3 on the glass-run body 1.

ACTION AND EFFECT OF THE INVENTION

A rubber composition for a glass-run of the present invention is prepared by blending an EPDM with an adhesive modifier of the three component system or the two component system and provides the action and effects set forth below.

The desired adhesion properties between the EPDM base material and the urethane lubricating layer as shown in the examples are obtained without blending a rubber polymer other than the EPDM as a raw rubber material.

Therefore, the rubber composition of the present invention does not have the above-described problems generated by using an EPDM/SBR blend polymer. Since excellent vulcanized rubber properties (specifically, ozone-resistance) inherently possessed by the EPDM are lost by blending with SBR, and chemicals used in vulcanization are easily transferred from the EPDM to SBR which has high polarity as compared with the EPDM, it was previously difficult to obtain a vulcanized rubber having properties needed for glass-run.

Specific examples for supporting the effects of the present invention are described below.

EXAMPLES 1 TO 8 AND COMPARATIVE EXAMPLES 1 TO 3

While extruding (extruder speed: 5 m/minute) the rubber composition shown in Table 1 by using a single-screw extruder (cylinder diameter: 60 mm, compression ratio: 1.5) to form the glass-run body 1, the urethane paint shown in Table 2 was coated thereon to form the urethane lubricating layer. The resulting glass-run was carried into a hot air vulcanizer and then the glass-run equipped with the urethane lubricating layer 3 (layer thickness: 100 microns) having the cross section shown in FIG. 2 was produced by vulcanizing and curing the glass-run body 1 and the urethane lubricating layer for 10 minutes at 200 degrees C.

The obtained glass-run was subjected to adhesive strength test (180° peeling off) after standing for 24 hours at room temperature.

For measuring the adhesive strength between the urethane lubricating layer 3 (a base part: 1a side in FIG. 2) and the glass-run body 1, a cotton fabric was adhered on a surface side of the urethane lubricating layer which was coated with an instantaneous adhesion agent, and then the urethane lubricating layer with the cotton fabric was punched as a rectangle of 5 mm in width and 100 mm in length for preparing each specimen.

The adhesive strength of each specimen was measured under a stress rate of 5 cm/minute. The results of Examples and Comparative Examples are shown in Table 3.

As is apparent from the results, it is understood excellent adhesive strength cannot be obtained, if the adhesive modifier of the present invention is not contained in the rubber composition (See Comparative Examples 1) or if the adhesive modifier which does not contain a metal hydroxide such as aluminum hydroxide is used (See Comparative Examples 2).

Furthermore, as is apparent from the results, it is understood excellent adhesive strength can be obtained only with difficulty, if the adhesive modifier which does not contain the amine-containing compound and contains a small (sum) amount of the glycidyl ether and aluminum hydroxide is used (Comparative Examples 3).

TABLE 1

Basic Formulation of EPDM composition

| | |
|---|---|
| EPDM | 100 parts |
| FEF carbon | 185 parts |
| Paraffin oil | 90 parts |
| Calcium carbonate | 30 parts |
| Zinc white | 5 parts |
| Processing aid | 5 parts |
| Sulfur | 1.5 parts |
| Accelerator | 4.5 parts |
| Adhesive modifier | As described in Table 3 |

TABLE 2

Formulation of urethane paint

| | |
|---|---|
| Polyetherpolyol | 30 parts |
| Ester group and ether group-containing branched-polyalcohol | 70 parts |
| Dimethylsilicone oil (viscosity: 100,000 Cst) | 20 parts |
| Tetrafluoroethylene resin powder | 20 parts |
| Dimethylmethane diisocyanate | 10 parts |
| Pigment (carbon black) | 1 part |

Note: viscosity; 2,700 cPs

TABLE 3

| | Comparative Example 1 | Examples 1 | 2 | 3 | Comparative Example 2 | Examples 4 | 5 | 6 | 7 | 8 | Comparative Example 3 |
|---|---|---|---|---|---|---|---|---|---|---|---|
| Adhesive modifier BPP-350*[1] | — | 5 | 10 | 20 | 20 | 20 | 20 | 20 | 10 | 10 | 10 |
| Nocrack 224*[2] | — | 2 | 2 | 2 | 2 | 2 | 0 | 0 | 2 | 0 | 0 |
| Hyji light H42M*[3] | — | 50 | 50 | 50 | 0 | 20 | 20 | 50 | 20 | 50 | 20 |
| Adhesive strength (N/5 mm) | 3.4 | 16.7 | 18.2 | 19.8 | 7.4 | 23.5 | 14.1 | 20.5 | 18.0 | 17.4 | 7.2 |
| Destructive state*[4] | P | D | D | D | M | D | D | D | D | D | M |

*[1] Ethylene oxide adduct of bisphenol A (manufactured by SANYO KASEI KOGYO KK)
*[2] Poly (2,2,4,-trimethyl-1,2-dihydro quinoline) (manufactured by OOUCHI SHOTEN KK)
*[3] Aluminum hydroxide (average particle diameter: 1 micron) (manufactured by SHOWA DENKO KK)
*[4] State of destruction:
P: Interfacial peeling off
D: Destruction of backing base material
M: Destruction of a part of backing base material While the invention has been described in detail and with reference to specific embodiments thereof, it will be apparent to one skilled in the art that various changes and modifications can be made therein without departing from the spirit and scope thereof.

What is claimed is:

1. A glass-run equipped with a urethane lubricating layer on the glass contact area, which comprises an EPDM and an adhesive modifier, wherein the adhesive modifier comprises a glycidyl ether, and a metal hydroxide of a metal selected from metals of the III B group and the II A group.

2. The glass-run equipped with a urethane lubricating layer on the glass contact area as claimed in claim 1, wherein the adhesive modifier further contains an amine-containing compound as an epoxy group ring-opening accelerator.

3. The glass-run equipped with a urethane lubricating layer on the glass contact area as claimed in claim 1, wherein the glycidyl ether is a bisphenol A derivative and the metal hydroxide is aluminum hydroxide.

4. The glass-run equipped with a urethane lubricating layer on the glass contact area as claimed in claim 1, wherein the glycidyl ether is a bisphenol A derivative, the metal hydroxide is aluminum hydroxide and the amine-containing compound is a quinoline derivative or a phenylamine derivative.

5. The glass-run equipped with a urethane lubricating layer on the glass contact area as claimed in claim 1, wherein the adhesive modifier additionally comprises an amine-containing compound as an epoxy group ring-opening compound.

6. The glass-run equipped with a urethane lubricating layer on the glass contact area as claimed in claim 1, wherein amounts of the glycidyl ether and the metal hydroxide are 5 to 20 parts by weight and 20 to 100 parts by weight, respectively, per 100 parts by weight of the EPDM, and wherein the sum of amounts of the glycidyl ether and the metal hydroxide is at least 30 parts by weight per 100 parts by weight of the EPDM.

7. The glass-run equipped with a urethane lubricating layer on the glass contact area as claimed in claim 5, wherein amounts of the glycidyl ether, the metal hydroxide and the amine-containing compound are 5 to 20 parts by weight, 20 to 100 parts by weight and 0.5 to 5 parts by weight, respectively, per 100 parts by weight of the EPDM.

* * * * *